UNITED STATES PATENT OFFICE.

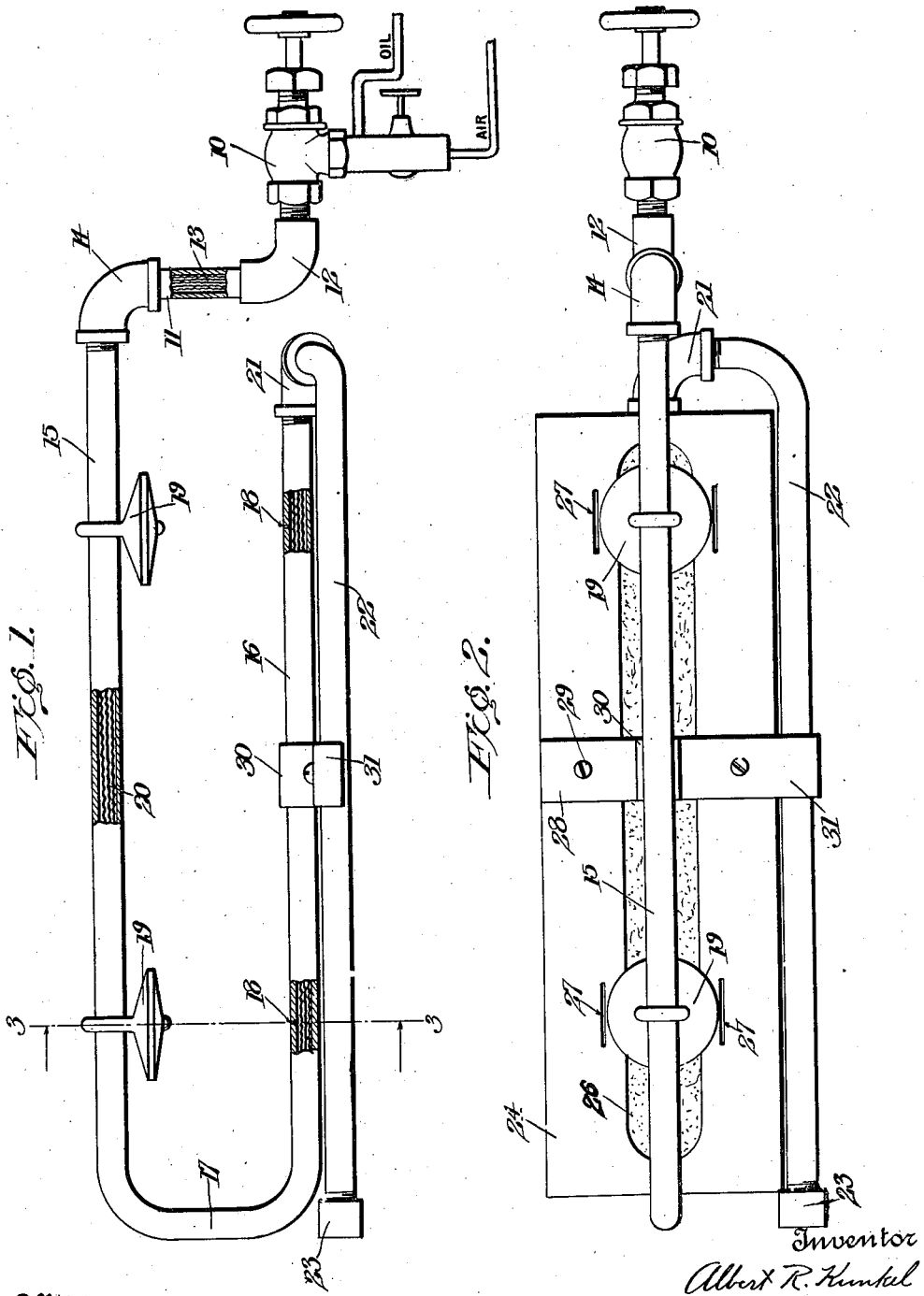

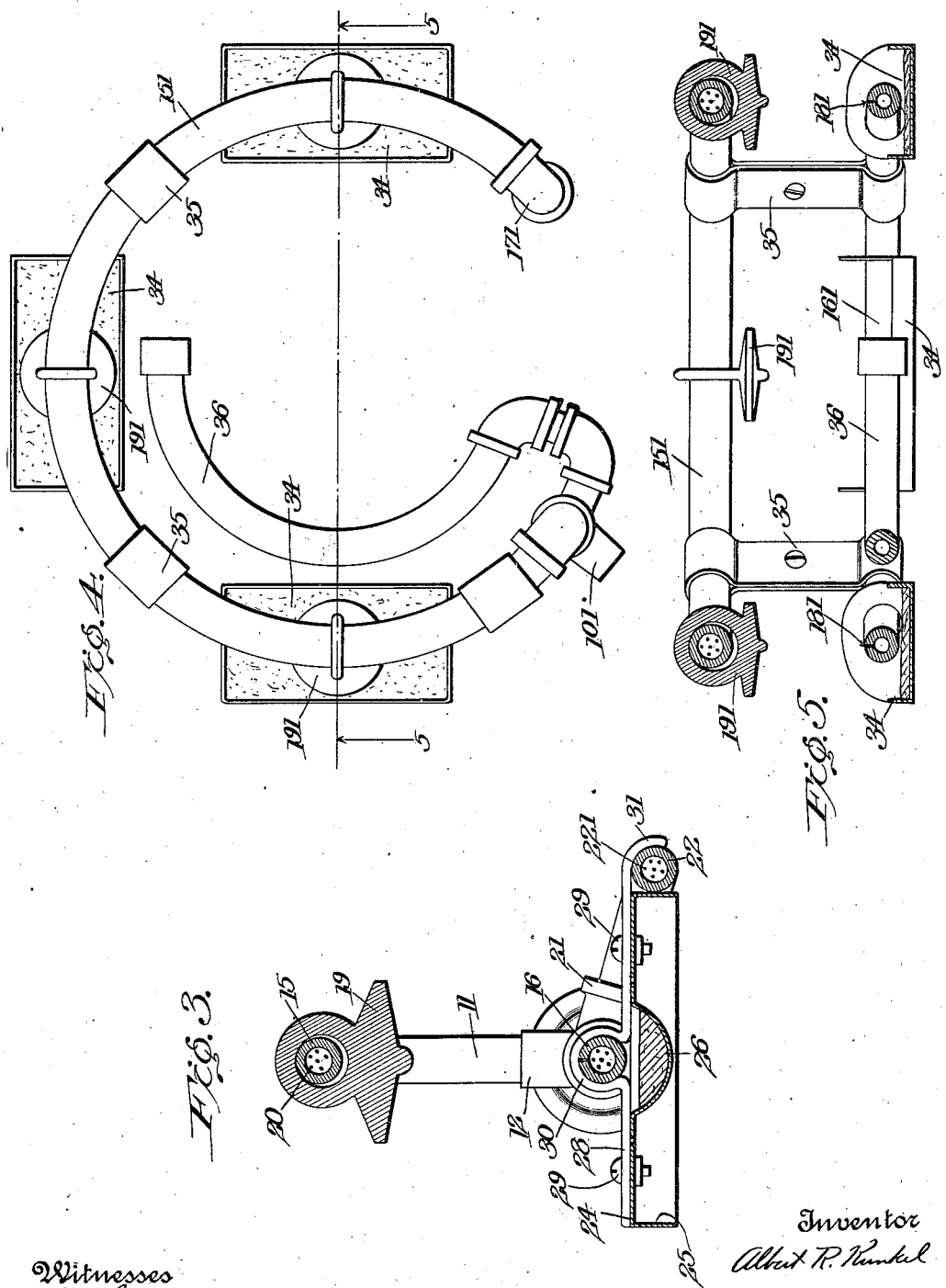

ALBERT R. KUNKEL, OF SAN ANTONIO, TEXAS.

OIL-BURNER.

1,184,185.  Specification of Letters Patent.  Patented May 23, 1916.

Application filed February 21, 1916. Serial No. 79,700.

*To all whom it may concern:*

Be it known that I, ALBERT R. KUNKEL, a citizen of the United States, and a resident of San Antonio, Bexar county, State of Texas, have invented certain new and useful Improvements in Oil-Burners, of which the following is a specification.

My invention relates to oil burners and has particular reference to improvements in burners of the type shown and described in my Patent No. 1,039,297 granted September 24, 1912.

The principal objects of the present invention are to provide for an even feed of gas in the burner described in the above mentioned patent and to insure a more thorough mixing of the air and oil before the gas is delivered to the outlet openings of the lower pipe, and also to provide means for supplying sufficient air for proper combustion of the issuing gas.

The above and other objects will be apparent from the following description taken in connection with the drawings in which, Figure 1 is a side view of a burner embodying my invention, parts of the pipes being shown broken away to disclose the interior thereof; Fig. 2 is a plan view of the burner; Fig. 3 is a transverse section on line 3—3 of Fig. 1; Fig. 4 is a plan view of a burner embodying my invention and designed for circular boilers; Fig. 5 is a transverse section of the same taken on the line 5—5 of Fig. 4.

Referring to the drawings, the air and oil are delivered under pressure by a mixing valve 10 which is similar to the mixing valve disclosed in my prior patent referred to above. The air and oil delivered under pressure from the mixing valve 10 enters a short pipe 11 through the elbow 12. The short vertical pipe 11 is filled with fine wire 13 or with gauze and acts as a strainer to clear the mixture of any foreign substances and also to still further mix the air and oil. From the pipe 11 the mixture of air and oil enters the upper end of the U-shaped generating and mixing device by way of the elbow 14. The gas mixing and generating device consists of a U-shaped tube having the upper pipe 15, the lower pipe 16 and the pipe 17 which connects the corresponding ends of the upper and lower pipes.

The lower pipe 16 is provided with a plurality of perforations 18 in the side thereof facing the upper pipe 15, the perforations 18 being the outlets for the mixture of oil, air and gas. Flame distributers 19 are hung on the upper pipe 15 opposite the outlets 18 and have inclined bottom faces to deflect the flame outwardly. A plurality of separate lengths of crimped or corrugated wires 20 are placed in the limbs 15 and 16 of the gas mixing and generating device and extend the full length of those limbs, serving to more thoroughly mix the oil and air. The crimped wire is more suitable than straight wire such as shown in my former patent because less wire is required and more thorough mixing is obtained.

The end of the lower pipe 16 opposite the connection 17 and beyond the perforations 18 is connected by an elbow 21 to a gas retainer 22. The gas retainer 22 consists of a length of pipe which is disposed at one side of the gas generating and mixing device proper and extends parallel to and alongside of the pipe 16 and is substantially the same length as the latter. The pipe 22 is imperforate and contains the crimped wires 221 and is closed at the end by a cap 23. The gas retainer formed by the pipe 22 insures an even feed of gas as it forms a storage chamber for the excess gas generated in the pipes 15 and 16.

The burner is provided with a drip pan which consists of a pressed galvanized iron member having a top 24 and sides 25. In the upper surface of the top 24 there is a depression 26 which extends longitudinally of the top 24 at the center thereof and terminates short of the ends of the top. The depression 26 constitutes an oil groove and is filled with asbestos which will receive the oil issuing from the openings 18 before the burner has heated up sufficiently to generate gas. The oil saturated asbestos constitutes priming means for the burner and provides an arrangement whereby the starting gas is generated in much less time than in the device of my former patent. The top 24 is also provided with pairs of short slots 27 which are cut through the top on opposite sides of the groove 26 and directly opposite the perforations 18 in the lower branch pipe 16. The slots 27 form air passageways to admit air to the region around the perforations from which the oil or gas issues. The air thus supplied will produce a more perfect combustion and also does away with the noise caused in constructions where the air supplied is insufficient.

The drip pan is connected to the lower pipe 16 by means of a galvanized iron clamp 28 which is fastened to the top 24 by means of screws 29 on opposite sides of the depression 26. Intermediate its ends the clamp 28 is bent at 30 so as to pass over the top of the pipe 16 and one of its ends extends beyond the lower edge of the drip pan, being bent downwardly as at 31 over the pipe 22 which is pressed along the side of the drip pan. It will be seen that the pipe 22 is disposed below the pipe 16 and at one side of the same and the parts being rigidly connected together the pipe 22 and the drip pan will serve to brace the mixing and generating device and keep it in upright position when it is installed. The return pipe 22 is therefore a valuable addition as it helps to support the burner on the drip pan and in position and also forms a storage for surplus gas while the burner is in action. The drip pan and the burner which it carries is set directly on the grate of a stove and the air slots 27 receive the air through the grate and are proportioned so as to deliver just the proper amount of air for combustion purposes. It will of course be understood that I may provide as many jets in the burner as desired and operate all at the same time. Consequently I am enabled to vary the size of the burner from a size which will fit the smallest stove to the largest.

In Figs. 4 and 5 I have illustrated a burner embodying my invention which is adapted for use with circular boilers. In this form of construction the pipes 151 and 161 corresponding to the pipes 15 and 16 of Figs. 1 to 3 are bent into circular shape and connected at one end by a pipe 171. A suitable needle valve 101 supplies the air and oil to the upper pipe, which also carries the flame distributers 191 at points thereof opposite the openings 181 in the upper side of the bottom pipe 161. The lower pipe 161 supports suitable drip pans 34 which are hung on the pipe directly beneath the openings 181 and are filled with asbestos to be saturated with oil for starting the burner. The drip pan may be of any design, the one shown in Figs. 1 to 3 being preferred. Clamps 35 may be positioned between the pipes 151 and 161 to keep them in proper spaced relation and provide a rigid structure. In this form of construction I have shown a return pipe 36 corresponding to the pipe 22 and forming a gas retainer, the same being connected to the lower pipe 161 at its end beyond the perforations therein and extending within the circular pipe 161. The pipe 36 may be omitted if desired.

While I have shown and described my invention in detail I do not wish to be limited to the exact forms disclosed as it is evident that minor changes may be made therein without departing from the spirit of the invention.

Having thus described the invention what is claimed and desired to be secured by Letters Patent is:

1. In an oil burner, the combination of a gas mixing and generating device having spaced branches, one of which is disposed above the other, the lower branch having outlet perforations therein facing the upper branch, and a gas retainer connected to and disposed adjacent the lower branch and constituting a storage chamber for surplus gas generated in said device.

2. In an oil burner, the combination of a gas mixing and generating device having spaced branch pipes connected together at one end, one of said pipes being disposed above the other, the lower pipe having outlet perforations therein facing the upper pipe, means for supplying air and fuel to the upper pipe, and an imperforate pipe connected to and disposed substantially parallel to the lower pipe along the side thereof and constituting a gas storage chamber for surplus gas generated in said device.

3. In an oil burner, the combination of a gas mixing and generating device comprising a U-shaped pipe providing spaced branches disposed one above the other, the lower branch having perforations therein facing the upper branch, means for supplying air and fuel to the upper pipe, and an imperforate pipe connected to the end of the lower pipe beyond the perforations therein and extending alongside the lower pipe, and constituting a gas storage chamber for surplus gas generated in said device.

4. In an oil burner, the combination of a gas mixing and generating device having spaced branch pipes connected together at one end to form a U-shaped tube, one of said pipes being disposed above the other, the lower pipe having outlet perforations therein facing the upper pipe, flame distributers on the upper pipe above the perforations in the lower pipe, means for supplying air and oil to the upper pipe, a drip pan beneath said device and secured thereto, said drip pan having an oil recess beneath the perforated pipe and also having air passages therein, and a gas retainer connected to the lower pipe and constituting a gas storage chamber for surplus gas generated in said device, said gas retainer extending alongside said device and bracing the same.

5. In an oil burner, the combination of a gas mixing and generating device having spaced branches, one of which is disposed above the other, the lower branch having perforations therein facing the upper branch, means for supplying air and fuel to the upper branch and a plurality of separate lengths of crimped or corrugated wires in one of said branches for mixing the air and fuel.

6. In an oil burner, the combination of a gas mixing and generating device having spaced branch pipes connected together at one end, one of said pipes being disposed above the other, the lower pipe having outlet perforations therein facing the upper pipe, means for supplying fuel and air to the upper pipe, and a plurality of separate lengths of crimped or corrugated wires in both of said branch pipes for mixing the fuel and air.

7. In an oil burner, the combination of a device having spaced branches, one of which is disposed above the other, the lower branch having perforations therein facing the upper branch, a gas retainer connected to said lower branch, a drip pan having a longitudinally extending oil groove disposed below the lower branch and adapted to catch oil from said perforations, and means for securing said device and gas retainer to the drip pan.

8. In an oil burner, the combination of a gas mixing and generating device having spaced branch pipes connected together, one of said pipes being disposed above the other, the lower pipe having outlet perforations therein facing the upper pipe, means for supplying air and oil to the upper pipe, and a drip pan below the lower pipe having spaced air passages therein on opposite sides of and below the perforations in the lower pipe, said drip pan also having a depressed portion in its top directly below the perforated portion of the lower branch pipe and between the spaced air passages therein to catch the oil flowing from said perforations.

9. A one-piece drip pan for oil burners having a central longitudinal depression in its top and pairs of short slots in the top on opposite sides of said depression, for the purpose set forth.

10. A one-piece sheet metal drip pan for oil burners comprising a sheet metal body having integral depending flanges at the edges thereof to support it, a central longitudinal depression in the top of said body and within the margin thereof to catch oil, and pairs of short parallel slots in the top spaced apart on opposite sides of said depression and having their outlets substantially flush with the upper surface of said top, as set forth.

In testimony whereof I affix my signature.

ALBERT R. KUNKEL.